United States Patent [19]

Shafer, Jr.

[11] Patent Number: 5,185,918
[45] Date of Patent: Feb. 16, 1993

[54] METHOD OF MANUFACTURING A COPPER BAR INDUCTION ROTOR

[75] Inventor: George G. Shafer, Jr., Anderson, Ind.

[73] Assignee: General Motors Corporation, Detroit, Mich.

[21] Appl. No.: 782,682

[22] Filed: Oct. 25, 1991

[51] Int. Cl.$^5$ ............................................. H02K 15/08
[52] U.S. Cl. ........................................ 29/598; 310/45; 310/211
[58] Field of Search .................... 310/211, 212, 42, 45; 29/598

[56] References Cited

U.S. PATENT DOCUMENTS

| | | | |
|---|---|---|---|
| 1,160,428 | 11/1915 | Markley | 310/211 X |
| 1,695,799 | 12/1928 | Daun | 310/211 X |
| 3,826,940 | 7/1974 | McKean et al. | 310/211 |

*Primary Examiner*—Carl E. Hall
*Attorney, Agent, or Firm*—Mark A. Navarre

[57] ABSTRACT

An improved method of manufacture of a shorted turn copper bar rotor which is amenable to high volume production and which provides a copper-to-copper electrical bond among the conductor bar end turn portions at each end of the rotor core. Once the rotor core laminations have been assembled on the rotor shaft, and the conductor bars have been inserted into the core slots, a cylinder or spool element is positioned in abutment with each axial end of the core to define annular cavities into which the conductor bar end turn portions extend. Each cavity has a continuous opening for permitting access to the end turn portions lying therein, and a molten copper plasma is sprayed into the opening of each cavity, thereby forming a copper-to-copper electrical bond among the end turn portions extending from each end of the core. The ends of the assembly are then shortened as necessary by machining to provide the required current carrying capacity.

4 Claims, 1 Drawing Sheet

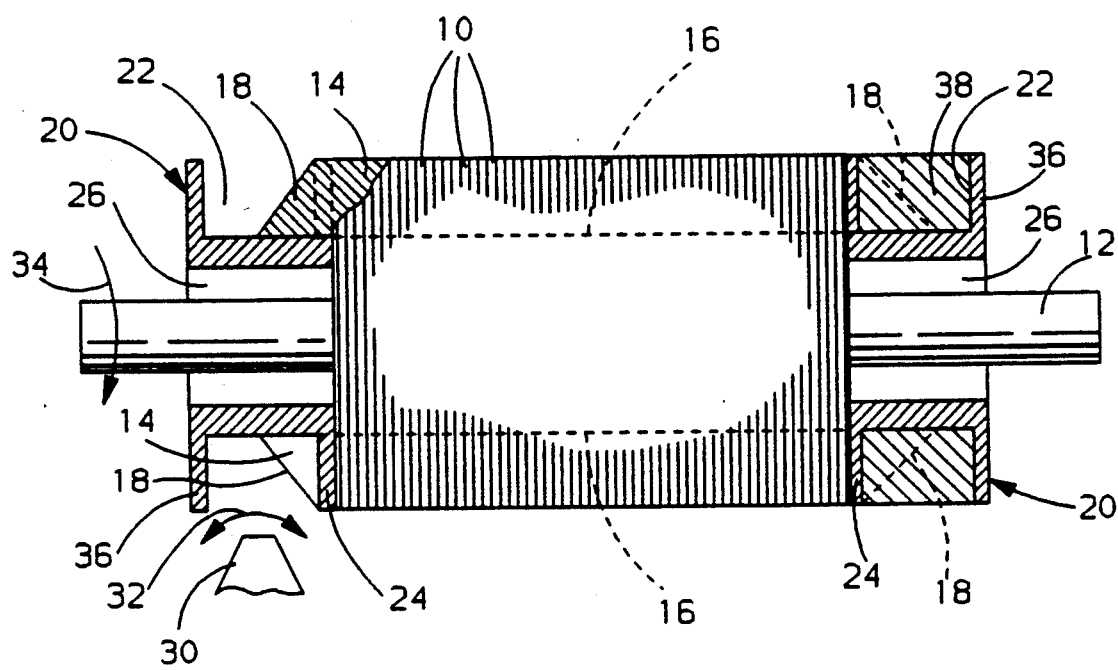

METHOD OF MANUFACTURING A COPPER BAR INDUCTION ROTOR

This invention relates to the manufacture of copper bar rotors for induction motors, and more particularly, to a method of manufacture which provides a copper-to-copper electrical connection between end turn portions of conductor bars at each end of the rotor.

BACKGROUND OF THE INVENTION

Induction rotors having shorted end turn conductors are manufactured in a number of different ways. Aluminum conductor rotors are typically manufactured by a die casting process in which molten aluminum is injected into a die defined about a laminated ferromagnetic core to form integral conductor bars and end rings.

Other materials, such as copper, are generally not conducive to die casting due to temperature limitations of the ferromagnetic core. Thus, the usual practice in the manufacture of copper bar induction rotors is to attach slotted copper end rings to each end of the rotor core, and individually attach the end turn portions of each conductor bar to the respective end ring by silver brazing or welding. The welding techniques (electron beam, TIG, MIG, etc.) tend to be expensive and difficult to control in high volume production. The brazing technique tends to be labor intensive and results in a higher resistance connection between the conductor bars and the end rings. Furthermore, the end rings themselves have to be precision machined and therefore add expense to the rotor manufacture.

SUMMARY OF THE PRESENT INVENTION

The present invention is directed to an improved method of manufacture of a shorted turn copper bar rotor which is amenable to high volume production and which provides a copper-to-copper electrical bond among the conductor bar end turn portions at each end of the rotor core. Once the rotor core laminations have been assembled on the rotor shaft, and the conductor bars have been inserted into the core slots, a cylinder or spool element is positioned in abutment with each axial end of the core to define annular cavities into which the conductor bar end turn portions extend. Each cavity has a continuous opening for permitting access to the end turn portions lying therein, and a molten copper plasma is sprayed into the opening of each cavity, thereby forming a copper-to-copper electrical bond among the end turn portions extending from each end of the core. The ends of the assembly are then shortened as necessary by machining to provide the required current carrying capacity.

In the illustrated embodiment, the spool element is formed of a light weight metal, such as aluminum, which operates as a current carrying element while reducing the copper content of the end turn connection assembly. The reduced copper content reduces the cost of the rotor and improves its high speed robustness.

BRIEF DESCRIPTION OF THE DRAWING

The single drawing is a sectional view of a partially manufactured rotor according to the method of this invention.

DETAILED DESCRIPTION OF THE INVENTION

The method of manufacture of this invention is applied to an induction motor rotor of conventional construction, as seen in the drawing. The left-hand end of the rotor, as viewed in the drawing, is depicted in a state of partial completion, while the right-hand end is depicted as fully completed.

The conventional steps of the manufacture include stacking a number of slotted steel laminations 10 onto a solid rotor shaft 12 to form a base core assembly, and inserting an elongate copper conductor bar 14 into each slot of the core. The bottom of the core slots, and thus, the radial depth of the inserted conductor bars 14 is designated by the broken line 16. The conductor bars 14 are longer than the lamination stack, and the tapered portions 18 which extend beyond each end of the lamination stack are referred to as end turn portions.

Following completion of the conventional subassembly described above, aluminum spool elements 20 are positioned in abutment with the axial ends of the lamination stack, as seen in the left-hand portion of the drawing. The spool elements 20 have a diameter which matches that of the lamination stack and define annular cavities 22 into which the conductor bar end turns 18 extend. To this end, the inboard wall 24 of each spool 20 is slotted to generally match the profile of the lamination stack.

The spool elements 20 need not be physically attached to the lamination stack so long as they are maintained in abutment therewith. In an actual mechanization of the subject method, a removable spacer (not shown) was inserted in the space 26 between the shaft 12 and spool element 20 to maintain concentricity.

The cavities 22 defined by spools 20 have a continuous opening in the radial direction which permits access to the exposed end turn portions 18, as shown. Once assembled, as shown in the left-hand portion of the drawing, the rotor is positioned in a fixture (not shown) in relation the nozzle 30 of a conventional copper plasma spray apparatus. The nozzle 30 oscillates from side-to-side during the spraying process as indicated by the arrow 32, and the rotor is rotated about its shaft 12 as indicated by the arrow 34. The molten copper plasma completely fills the cavity 22 as depicted in the right-hand portion of the drawing, forming a robust copper-to-copper bond among the conductor bar end turn portions 18. The copper-to-aluminum bonding also secures the spool element 20 to the end turn portions 18, tying together the entire assembly. The outboard spool wall 36 closes the cavity 22 and serves to limit the plasma spray.

To complete the manufacture of the rotor, the deposited copper 38 is turned on a lathe so that its diameter matches that of the lamination stack and spool 20. Then, if desired, the rotor assembly may be shortened by machining off part or all of the outboard wall 36, and part of the deposited copper 38. Balancing may be achieved by selectively removing additional copper or aluminum instead of by adding balancing weights.

While this invention has been described in reference to the illustrated embodiment, it is expected that various modifications will occur to those skilled in the art. For example, the inboard walls 24 of spool elements 20 may be omitted so that the cavities 22 are bounded by the ends of the lamination stack. In this regard, it will be understood that methods of manufacture incorporating such modifications may fall within the scope of this invention, which is defined by the appended claims.

The embodiments of the invention in which an exclusive property or privilege is claimed are defined as follows:

1. A method of manufacture of a shorted turn motor rotor having a ferromagnetic core secured on a rotor shaft, the core having axially extending slots in which are received elongate copper conductor bars, the conductor bars having end turn portions which extend out of the respective slots at each axial end of the core, the method comprising the steps of:

positioning a cylindrical element in abutment with each axial end of said core to define at each such end an annular cavity into which said end turn portions of said conductor bars extends, each cavity having a continuous opening in the radial direction for permitting access to end turn portions disposed therein; and spraying molten copper plasma into each cavity via the respective continuous opening, thereby to form a copper-to-copper electrical bond among the conductor bar end turn portions extending from each end of said core.

2. The method of manufacture set forth in claim 1, wherein said cylindrical elements each comprise coupled inboard and outboard sidewalls, said inboard sidewall being positioned in abutment with a respective axial end of said core, and slotted to receive respective end turn portions of said conductor bars.

3. The method of manufacture set forth in claim 1, including the step of:

rotating said core and cylindrical elements while the molten copper plasma is sprayed into said cavities.

4. The method of manufacture set forth in claim 1, where the cylindrical elements are formed in aluminum.

* * * * *